US011776353B2

(12) United States Patent
Huke et al.

(10) Patent No.: US 11,776,353 B2
(45) Date of Patent: Oct. 3, 2023

(54) METHOD OF DISPLAYING SPORTS PLAYER INFORMATION ON A SPORTS BETTING USER INTERFACE

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 2 days.

(21) Appl. No.: 17/513,156

(22) Filed: Oct. 28, 2021

(65) Prior Publication Data

US 2022/0139153 A1 May 5, 2022

Related U.S. Application Data

(60) Provisional application No. 63/107,676, filed on Oct. 30, 2020.

(51) Int. Cl.
*G07F 17/32* (2006.01)
*G06F 16/9535* (2019.01)
*G06Q 50/34* (2012.01)

(52) U.S. Cl.
CPC ........ *G07F 17/323* (2013.01); *G06F 16/9535* (2019.01); *G06Q 50/34* (2013.01); *G07F 17/3211* (2013.01); *G07F 17/3288* (2013.01)

(58) Field of Classification Search
CPC ............... G07F 17/323; G07F 17/3211; G07F 17/3288; G06F 16/9535; G06Q 50/34
See application file for complete search history.

(56) References Cited

U.S. PATENT DOCUMENTS

| | | | |
|---|---|---|---|
| 2003/0008711 A1 | 1/2003 | Corbo | |
| 2004/0192435 A1 | 9/2004 | Marshall et al. | |
| 2007/0060380 A1 | 3/2007 | McMonigle et al. | |
| 2010/0203935 A1 | 8/2010 | Levy et al. | |
| 2019/0304249 A1* | 10/2019 | Malek | G07F 17/3223 |
| 2021/0097819 A1* | 4/2021 | Bilzerian | G07F 17/3288 |

OTHER PUBLICATIONS

Notification of Transmittal of the International Search Report and the Written Opinion of the International Searching Authority dated Jan. 28, 2022, in connection with corresponding International Application No. PCT/US21/57271, 11 pages.

\* cited by examiner

*Primary Examiner* — Yingchuan Zhang
(74) *Attorney, Agent, or Firm* — Maier & Maier, PLLC (57) ABSTRACT

A method of displaying news relevant to the user of a play-by-play wagering system. For example, sending a notification to a user that a player they frequently wager on will be up in the next inning, and there are available wagers on the outcome.

13 Claims, 3 Drawing Sheets

| News Title | News Content | Source | Date |
|---|---|---|---|
| Each team's most pleasant surprise ... so far | Each new baseball season brings with it plenty of unexpected outcomes and performances. Whether it's a highly touted rookie living up to some lofty expectations or a career journeyman suddenly breaking out with a new club or a team's expected weakness instead proving to be a strength, every team has its share of surprises... | mlb.com | May 16th, 2021 |
| MLB Stat Leaders 2021 | Batting Leaders - All MLB BATTING AVERAGE 1 Yermin Mercedes ... | espn.com | May 16th, 2021 |
| Seager placed on IL with fractured right hand | LOS ANGELES -- The Dodgers have overcome an avalanche of injuries so far this season, but now they're going to be without Corey Seager for an extended period of time, as X-rays showed the star shortstop suffered a fractured right hand in Saturday's 7-0 win against the Marlins. | mlb.com | May 16th, 2021 |
| - | - | - | - |
| - | - | - | - |

METHOD OF DISPLAYING SPORTS PLAYER INFORMATION ON A SPORTS BETTING USER INTERFACE

FIELD

The present disclosures are generally related to play-by-play wagering on live sporting events.

BACKGROUND

While many sports fans support a team or teams, some are also instead in supporting individual players. This trend may continue to grow due to the increase in the social media presence of individual players.

Unfortunately, this may mean that sports fans that follow different players on different teams may not be able to watch all the games in which those players are playing in real-time, especially when they are on at the same time.

Fans who might love to place wagers on their favorite football player may also not want to miss out on watching their favorite basketball team or may already have agreed to watch a baseball game with friends or family.

BRIEF DESCRIPTIONS OF THE DRAWINGS

The accompanying drawings illustrate various embodiments of systems, methods, and various other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. The described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that specific circuits can perform the various sequence of actions described herein (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, and/or hit performed by a participant in a sporting event. In some embodiments, an action may be a strategic decision made by a participant in the sporting event, such as a player, coach, management, etc. In some embodiments, an action may be a penalty, foul, or other type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "bet" or "wager." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for certain amount or for a future time. A "bet" or "wager" can be made for being able to answer a question correctly. A "bet" or "wager" can be made within a certain period. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain to place bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that will be determined by a point spread or money line. The term "straight-up" means winning the game without any regard to the "point spread," a "money-line" bet. "Money line," "straight bet," and "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread." A handicap of the "point spread" value is given to the favorite team so bettors can choose sides at equal odds. "Cover the spread" means that a favorite wins an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread." The "opening line" means the earliest line posted for a particular sporting event or game. The term "pick" or "pick-em" refers to a game when neither team is favored in an event or game. "Line," "cover the spread," "cover," "tie," "pick," and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total," "over," and "under" can be integrated into the embodiments in a variety of manners.

A "parlay" is a single bet that links together two or more wagers; to win the bet, the player must win all the wagers in the "parlay." If the player loses one wager, the player loses the entire bet. However, if they win all the wagers in the "parlay," the player receives a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay," "round robin," "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games, and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events.

Typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both pitchers scheduled to start a game start. If they do not, the bet is deemed "no action" and refunded. The "run line" in baseball refers to a spread used instead of the money line. "Listed pitchers," "no action," and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle," "juice," vigorish," "vig," and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individuals that would deploy, for fees, and may be part of, or perform, various system elements or method steps in the embodiments.

Managed service user interface service is a service that can help customers (1) manage third parties, (2) develop the web, (3) perform data analytics, (4) connect thru application program interfaces and (4) track and report on player behaviors. A managed service user interface can be integrated into the embodiments in a variety of manners.

Managed service risk management service are services that assist customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land based on property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are services that help customers with (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat players to free bets, odds boosts, enhanced access, and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by always managing commission and availability. The "cash out" or "pay out" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth by creating and delivering actionable insights on performance to help customers to manage the sports gaming. Business Applications can be integrated into the embodiments in a variety of manners.

State-based integration allows for a given sports gambling game to be modified by states in the United States or other countries, based upon the state the player is in, mobile phone, or other geolocation identification means. State-based integration can be integrated into the embodiments in a variety of manners.

Game Configurator allows for configuration of customer operators to have the opportunity to apply various chosen or newly created business rules on the game as well as to parametrize risk management. The Game Configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery and licensing method in which software is accessed online via a subscription rather than bought and installed on individual computers. Software as a service can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support enable users to quickly obtain additional information about the content they see without any user-based input or search efforts. A short media clip (audio, video, or both) is selected to start the recognition. This clip could be selected from within a media file or recorded by a device. Through algorithms such as fingerprinting, information from the actual perceptual content is taken and compared to a database of reference fingerprints, wherein each reference fingerprint corresponds with a known recorded work. A database may contain metadata about the work and associated information, including complementary media. If the media clip's fingerprint is matched, the identification software returns the corresponding metadata to the client application. For example, during an in-play sports game, a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet"—which is a computer-generated data point—is placed above the player that is bet on. Augmented reality can be integrated into the embodiments in a variety of manners.

Some embodiments of this disclosure, illustrating all its features, will now be discussed in detail. It can be understood that the embodiments are intended to be open-ended in that an item or items used in the embodiments is not meant to be an exhaustive listing of such item or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

Figure 1:
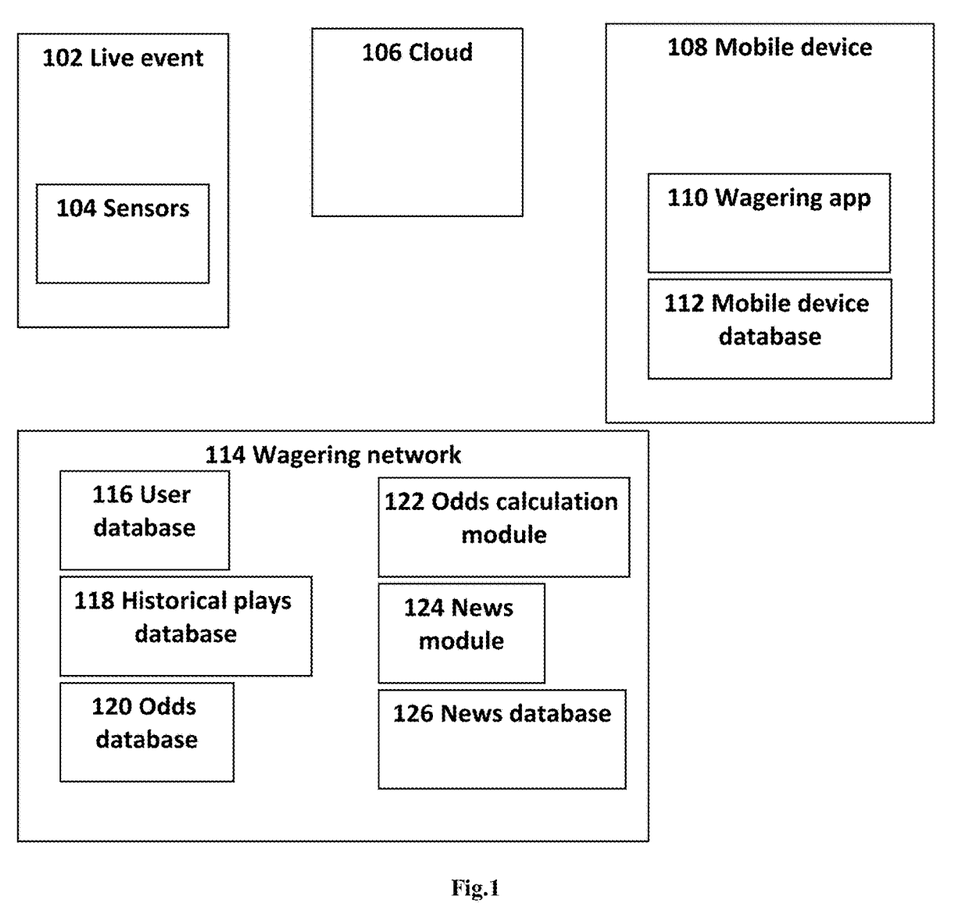
FIG. 1: illustrates a system for displaying news related to a player, according to an embodiment.

FIG. 1 is a system for displaying news related to a player. This system may include a live event 102, for example, a sporting event such as a football, basketball, baseball, or hockey game, tennis match, golf tournament, eSports, or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. The wagering network 114 can offer several SaaS managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include, but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include but is not limited to, a plurality of betting attributes such as at least one of the following: the live event 102, a team, a player, an amount of wager, etc. The user database 116 may include, but is not limited to, information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120—that may contain the odds calculated by an odds calculation module 122—to display the odds on the user's mobile device 108 and take bets from the user through the mobile device wagering app 110.

Further, embodiments may include the odds calculation module 122, which may utilize historical play data to calculate odds for in-play wagers.

Further, embodiments may include a player news module 124, which may find which players (or teams, leagues, sports, etc.) a user may follow from the player follower database 128 and search for relevant news data in the news database 126. The news data may then be sent to the mobile device 108 to be displayed by the wagering app 110. Relevant news data may be determined by finding information in the news data related to the followed player or players.

Further, embodiments may include a news database 126 containing news data related to the live event 102. News data may include news articles, stats, reports, opinions, live commentary, etc. The data may contain meta tags for easier searching. News data related to the live event 102 may be news about the live event 102, the teams, the players, similar teams or players, similar events, weather, etc.

Further, embodiments may include a player follower database 128, which may contain a list of players that a user is following. Alternatively, player follower database 128 could be another form of "follower database", such as a team follower database, league follower database, sport follower database, and the like. Following may mean that the user has expressed an interest, or has shown, by past behavior, that they want to or may be interested in receiving updates and news about the player, team, league, sport, etc. Further, any player, team, league, sport, or other general sport information that a user may have expressed an interest in or has shown, by past behavior, that they may be interested in receiving updates about may be generally understood and referred to as follower information.

Further, embodiments may include a player wager module 130, which may direct users to wager options available for players they follow, or any other follower information and associated wager options.

Figure 2:
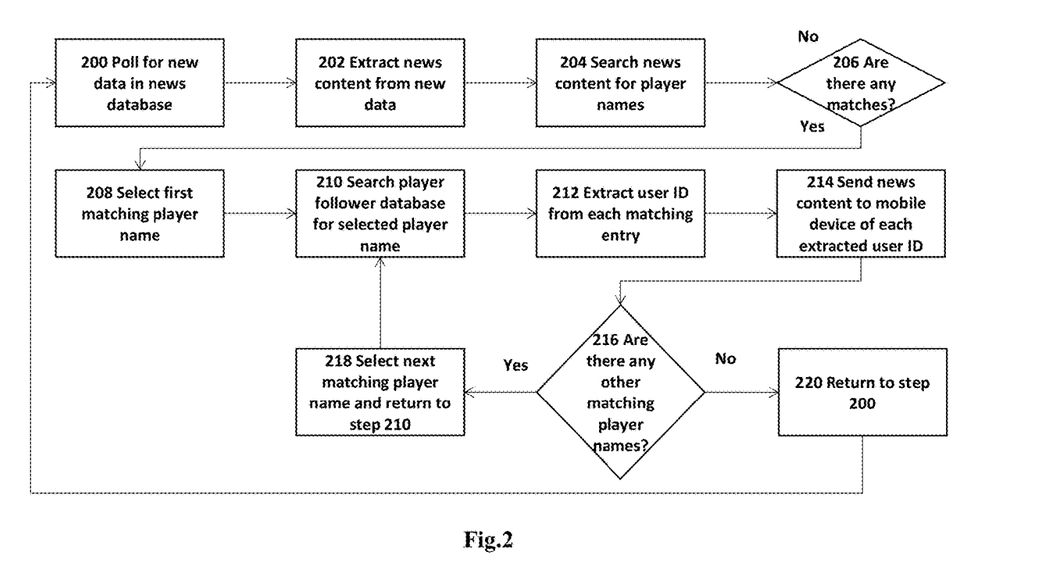
FIG. 2: illustrates a player news module, according to an embodiment.

FIG. 2 illustrates the player news module 124, which could also be a follower module in general. The process may begin with the player news module 124 polling, at step 200, for a new data entry in the news database 126. An entry in the news database 126 may correspond with the publication of a new news story, new statistics, social media posts, and the like which may then be automatically or manually entered into the news database 126. The player news module 124 may extract, at step 202, the news content from the new data entry. The player news module 124 may also extract metadata, the title, the date, or any other data in the entry, which may be used to identify if the news data is relevant to any players (or any other follower information). The player news module 124 may search, at step 204, the extracted news content for player names, team names, leagues names, sport names, and the like. For example, this string of text from a news article, "now they're going to be without Corey Seager for an extended period of time," contains the name of the player Corey Seager. This search may be a text search which may include variations of the player's name. For example, shortened versions of the name such as "Bob" instead of "Robert" or "Bobby," or misspellings of the name, for example, "Micheal" instead of "Michael." The search may also use search algorithms to determine if the name is being used in a significant context. For example, if the players' names appear in a paragraph of an article, it may be significant, but if the name is just one in a list of 100 with no other context, it may not be. The search may also search the title or metadata of the news data if they were extracted in step 202. Player names may be stored, and variations may be stored in the player follower database 128 or retrieved from publicly available sources. The player news module 124 may determine, at step 206, if there are any player name matches in the news content. If there are no player names, the player news module may return to step 200, and/or look for higher level data, such as team names, opponent team or player names, league names, sport names, and the like. If there are player name matches in the news content, the player news module 124 may select, at step 208, the first matching player name. The player news module 124 may search, at step 210, the player follower database 126 for the selected player name. If the name is a variation of the player's name, it may be changed to the player's name that is used for the player follower database 126 The player news module 124 may extract, at step 212, the user ID of each entry that has a player name that matches the selected player name. For example, if the first matching player name in the news content is Corey Seager and user JS1234 follows Corey Seager, the user ID JS1234 may be extracted. The player news module 124 may send, at step 214, the news content to the mobile device 108 associated with each extracted user ID. This content may then be displayed via the wagering app 110. The player news module 124 may determine, at step 216, if there are any other matching player names in the news content. If there are other matching player names in the news content, the player news module 124 may select, at step 218, the next player's name and return to step 210. If there are no other matching player names in the news content, the player news module 124 may return, at step 220, to step 200.

Figure 3:
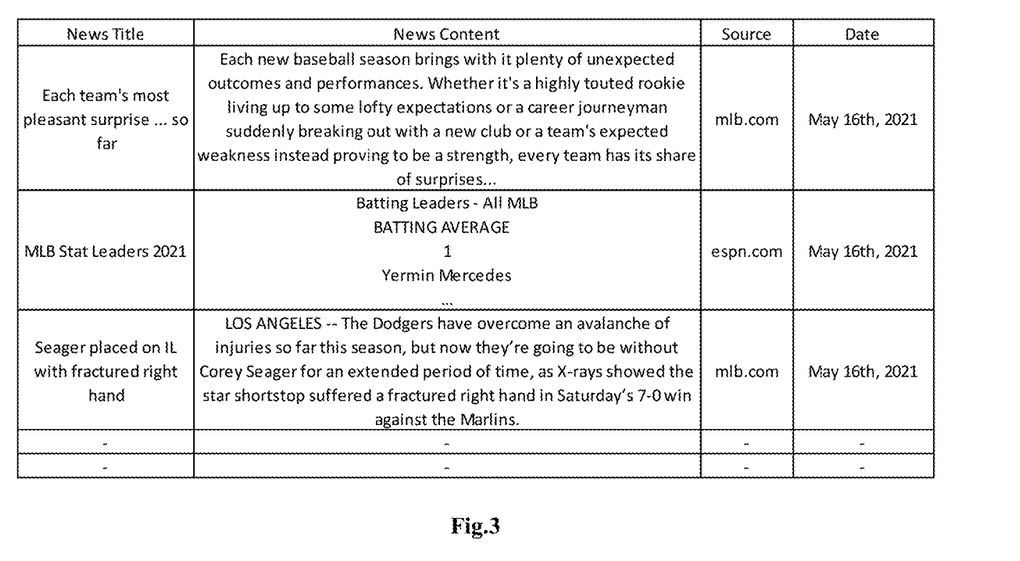
FIG. 3: illustrates a news database, according to an embodiment.

FIG. 3 illustrates the news database 126. The news database 126 may contain news data that may be useful to users in deciding how to wager. The news database 126 may contain news articles or social media relevant to the live event 102, the teams, the players, similar teams or players, similar events, weather, any follower information, or any other factor that may inform the user about how best to place their wager. The news database 126 may contain titles and content for each entry, a source where the news data was obtained, and a date.

Figure 4:
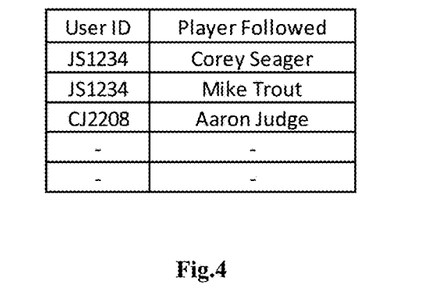
FIG. 4: illustrates a player follower database, according to an embodiment.

FIG. 4 illustrates the player follower database 128, which may also a follower database, as described above. The player follower database may contain the names of players (or teams, leagues, sports, etc.) that a user is following and the user's user ID. This database may be populated manually by users selecting which players to follow or by a module that tracks user behavior to identify which players they are most interested in.

Figure 5:
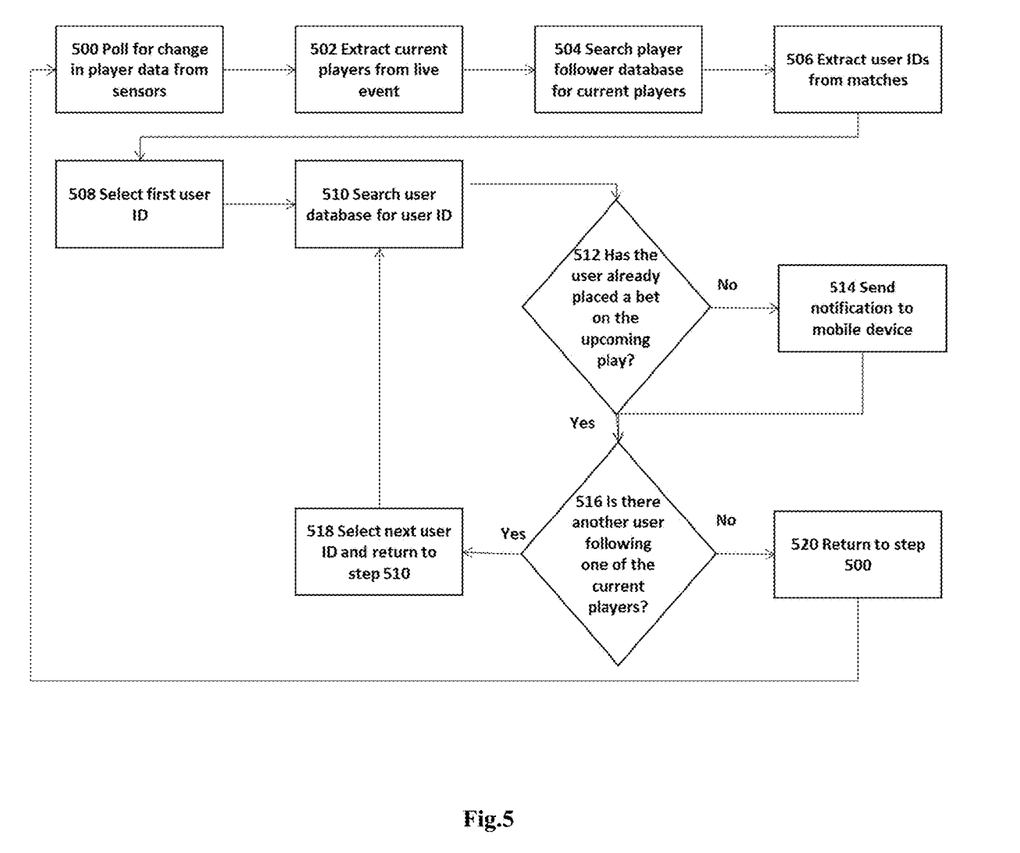
FIG. 5: illustrates a player wager module, according to an embodiment.

FIG. 5 illustrates the player wager module 130, which could also be a follower wager module. The process may begin with the player wager module 130 polling, at step 500, for a change in player data from the sensors 104 of the live event 102. A change in player data may occur when a new player becomes active in the next play, for example, the next at-bat in baseball or a substitution in American football. The player wager module 130 may extract, at step 502, data on the current players of the live event 102. Current players may refer to players taking part in the current or upcoming play of the live event 102. The player wager module 130 may search, at step 504, the player follower database 128 for each of the current players of the live event 102. Alternatively, the player wager module 130 may only search for the players that recently became active in the live event 102. The player wager module 130 may extract, at step 506, the user IDs of users following the current players. The player wager module 130 may select, at step 508, the first extracted user ID. The player wager module 130 may search, at step 510, the user database 116 for the user ID. The player wager module 130 may determine, at step 512, if the user has already placed a wager on the current or upcoming play of the live event 102. This determination may be made by checking if the selected user ID has a wager associated with it in the user database 116 that corresponds to the current or upcoming play of the live event 102. If the user has already placed a wager on the current or upcoming play of the live event 102, the player wager module may skip to step 516. If the user has not already placed a bet on the current or upcoming play of the live event 102, the player wager module 130 may send, at step 514, a notification to the mobile device 108 associated with the selected user ID. The notification may include an indication that a wager on a followed player is available. For example, the notification may read, "Aaron Judge just took the field. Place your bets now!". The notification may include a link that directs to a menu where the user can place a wager on the play in the wagering app 110. The player wager module 130 may determine, at step 516, if another user follows one of the current players of the live event 102. If another user follows one of the current players of the live event 102, the player wager module 130 may select, at step 518, the next user ID and return to step 510. If there is not another user following one of the current players of the live event 102, the player wager module 130 may return, at step 520, to step 500.

The foregoing description and accompanying figures illustrate the principles, preferred embodiments, and modes of operation of the invention. However, the invention should not be construed as being limited to the embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for displaying relevant news to a user of a sports wagering network, comprising:
   identifying, by a processor, a new data entry added to a news database;
   extracting, by the processor, news content from the new data entry;
   parsing, by the processor, the news content for one or more follower identifiers;
   searching, by the processor, a follower database for entries which match the one or more follower identifiers contained in the news content, the follower database comprising a plurality of user IDs, each user ID associated with at least one follower identifier, and the at least one follower identifier relating to at least one of a player or athlete, a sports team, sport, and a sports league;
   determining whether any of the plurality of user IDs which match the one or more follower identifiers correspond to a change in player data on a current or upcoming action of a real-time or future live event; and
   sending, to a mobile device of those of the plurality of user IDs which match the one or more follower identifiers, the news content, wherein the news content includes the change in player data corresponding to the one or more follower identifiers,
   wherein the new data entry is populated to the news database by at least one sensor arranged at the real-time live event,
   wherein the sensor monitors the real-time live event for the change in player data, and
   wherein the sensor comprises at least one of a camera, tracking device, GPS chip, or RFID tag.

2. The method for displaying relevant news to the user of the sports wagering network of claim 1, wherein sending to the mobile device further comprises:
   transmitting a notification.

3. The method for displaying relevant news to the user of the sports wagering network of claim 2, wherein the notification comprises a banner, text, message, or pop-up.

4. The method for displaying relevant news to the user of the sports wagering network of claim 1, wherein the new data entry comprises a set of live event statistics or a publication of a news story regarding a team or teams, a player or players, a league or leagues, or weather of a live event.

5. The method for displaying relevant news to the user of the sports wagering network of claim 1, wherein parsing the news content further comprises:
   use of an algorithm to search the new data entry for contextual use of a player name, a team name, a league name, or a sport name.

6. The method for displaying relevant news to the user of the sports wagering network of claim 1, wherein the at least one follower identifier comprises at least one of a player name, a team name, a league name, or a sport name.

7. The method for displaying relevant news to the user of the sports wagering network of claim 1, wherein one or more of the plurality of user IDs of the follower database are associated with the at least one follower identifier automatically based on a tracked behavior of a corresponding user.

8. A system for displaying relevant news to a user of a sports wagering network, comprising:
   a processor;
   a news database, entries of the news database containing at least one of a news title, content, source, and date; and
   a follower database, the follower database comprising a plurality of user IDs, each user ID associated with at least one follower identifier, and the at least one follower identifier relating to at least one of a player or athlete, a sports team, sport, and a sports league;
   wherein the processor is configured to:
   identify a new data entry added to the news database;
   extract news content from the new data entry;
   parse the news content for one or more follower identifiers;
   search the follower database for entries which match the one or more follower identifiers contained in the news content;
   determine whether any of the plurality of user IDs which match the one or more follower identifiers correspond to a change in player data on a current or upcoming action of a real-time or future live event; and
   send to a mobile device of those of the plurality of user IDs which match the one or more follower identifiers, the news content, wherein the news content includes the change in player data corresponding to the one or more follower identifiers,
   wherein the new data entry is populated to the news database by at least one sensor arranged at the real-time live event,
   wherein the sensor monitors the real-time live event for the change in player data, and
   wherein the sensor comprises at least one of a camera, tracking device, GPS chip, or RFID tag.

9. The system for displaying relevant news to the user of the sports wagering network of claim 8, wherein sending to the mobile device further comprises:
   transmitting a notification.

10. The system for displaying relevant news to the user of the sports wagering network of claim 8, wherein the new data entry comprises a set of live event statistics or a publication of a news story regarding a team or teams, a player or players, a league or leagues, or weather of a live event.

11. The system for displaying relevant news to the user of the sports wagering network of claim 8, wherein parsing the news content further comprises use of an algorithm to search the new data entry for contextual use of a player name, a team name, a league name, or a sport name.

12. The system for displaying relevant news to the user of the sports wagering network of claim 8, wherein the at least one follower identifier comprises at least one of a player name, a team name, a league name, or a sport name.

13. The system for displaying relevant news to the user of the sports wagering network of claim 8, wherein one or more of the plurality of user IDs of the follower database are associated with the at least one follower identifier automatically based on a tracked behavior of a corresponding user.

* * * * *